INVENTORS,
O. E. ESVAL, R. S. CURRY,
C. F. FRAGOLA, & L. F. BEACH;
BY
Herbert H. Thompson
THEIR ATTORNEY.

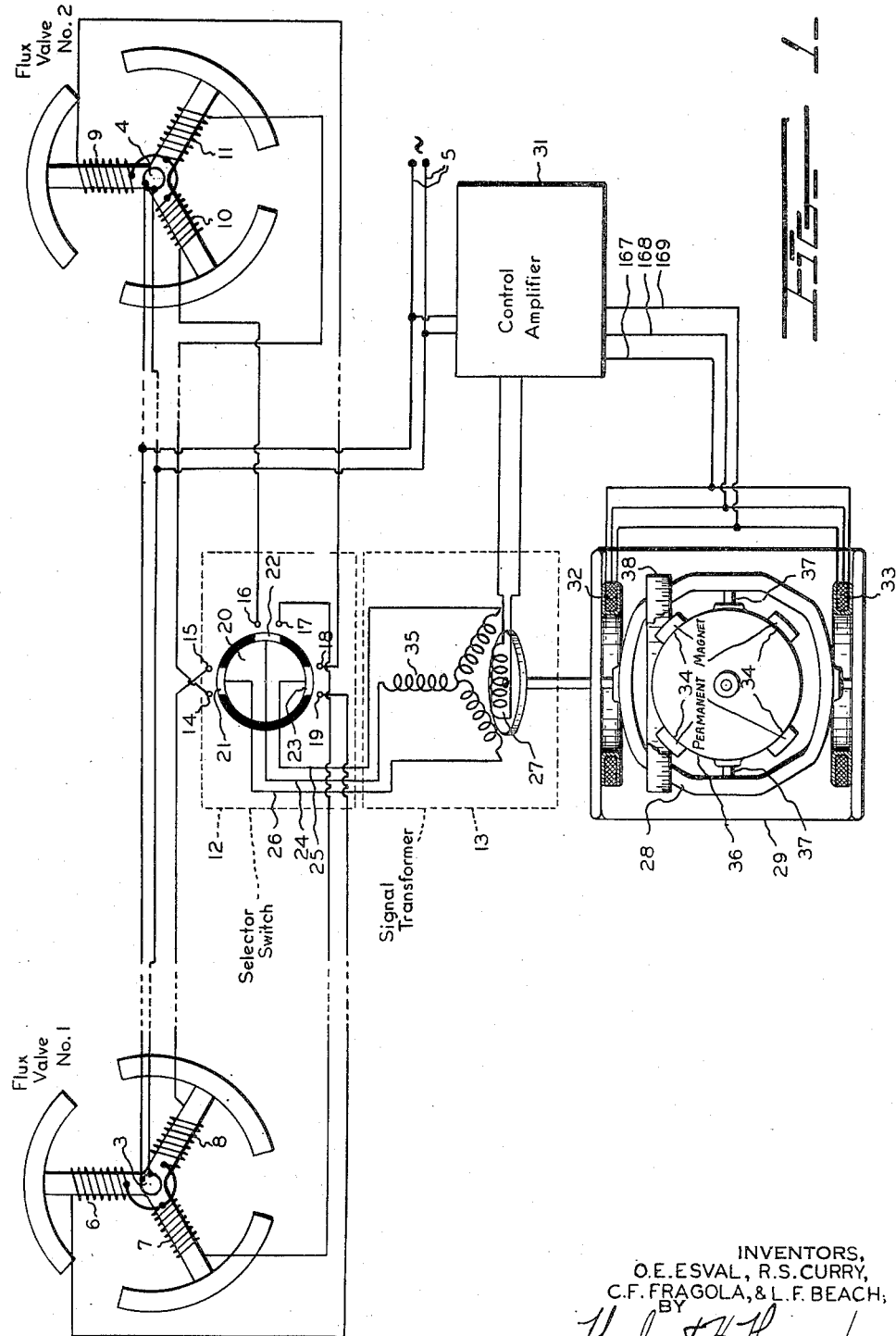

Aug. 28, 1945.   O. E. ESVAL ET AL   2,383,461
FLUX VALVE COMPASS SYSTEM
Filed Oct. 10, 1941   6 Sheets-Sheet 3

INVENTORS,
O.E. ESVAL, R.S. CURRY,
C.F. FRAGOLA, & L.F. BEACH;
BY
Herbert N. Thompson
THEIR ATTORNEY.

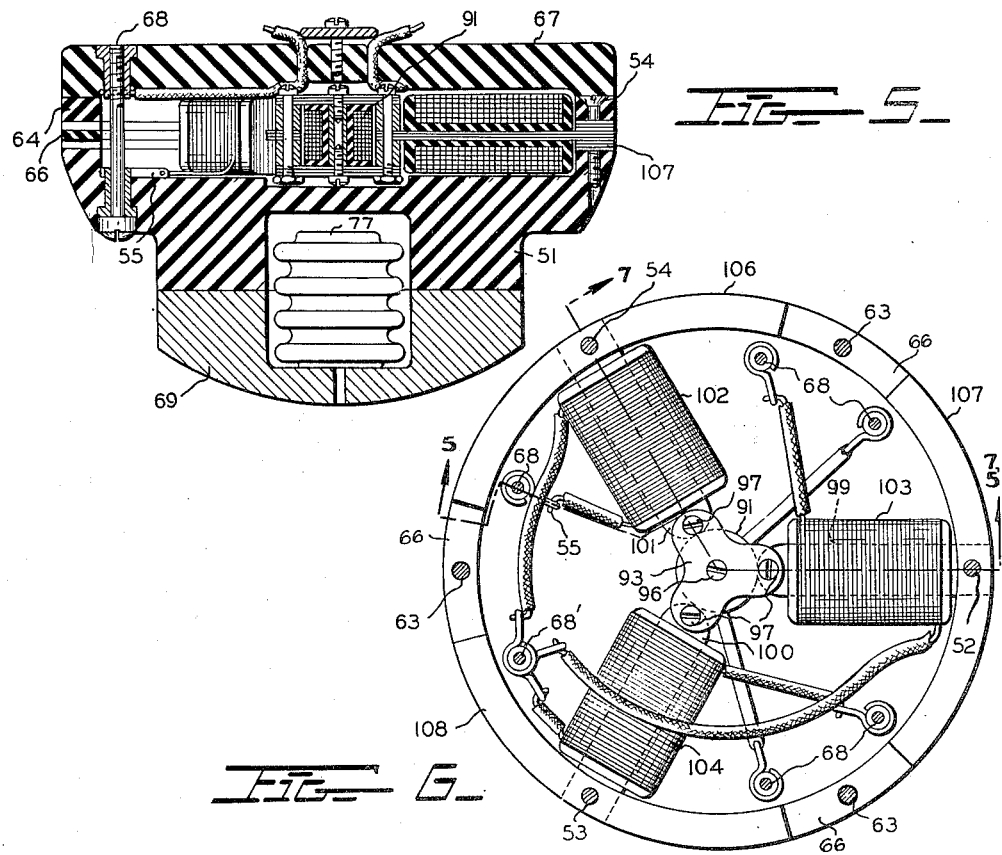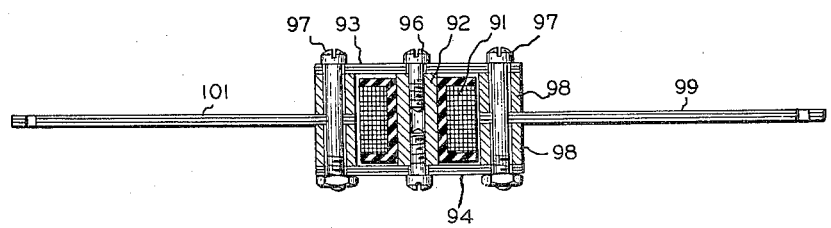

Aug. 28, 1945.  O. E. ESVAL ET AL  2,383,461

FLUX VALVE COMPASS SYSTEM

Filed Oct. 10, 1941  6 Sheets-Sheet 5

INVENTORS,
O. E. ESVAL, R. S. CURRY,
C. F. FRAGOLA, & L. F. BEACH;
BY Herbert H. Thompson
THEIR ATTORNEY

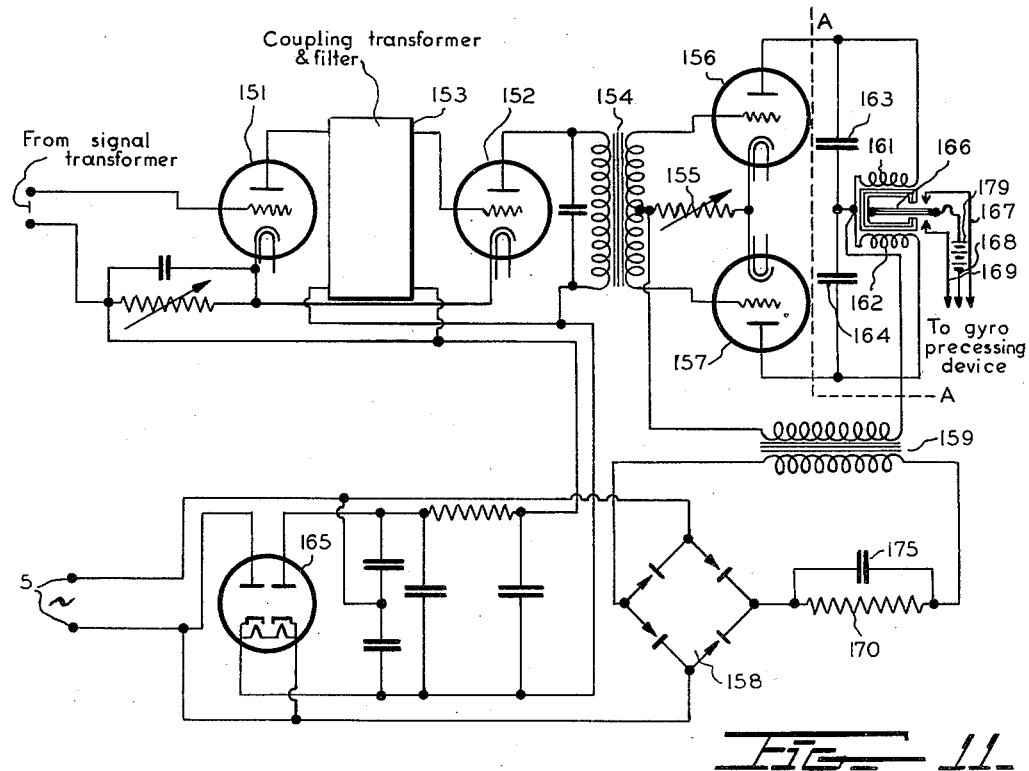
FIG. 11
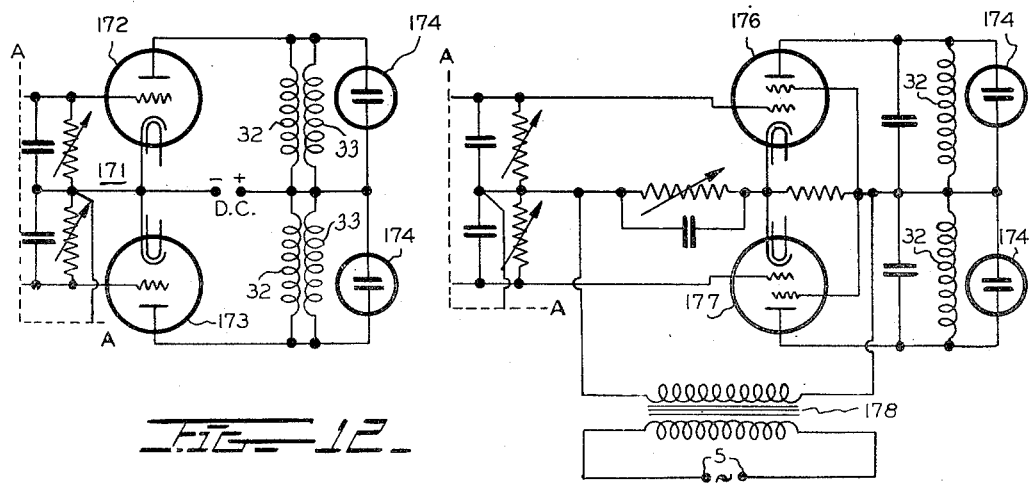
FIG. 12
FIG. 13
INVENTORS,
O. E. ESVAL, R. S. CURRY,
C. F. FRAGOLA, & L. F. BEACH;
BY
Herbert H. Thompson
THEIR ATTORNEY Patented Aug. 28, 1945

2,383,461

UNITED STATES PATENT OFFICE 2,383,461

FLUX VALVE COMPASS SYSTEM

Orland E. Esval, Merrick, Robert S. Curry, Baldwin, Caesar F. Fragola, Brooklyn, and Lennox F. Beach, Merrick, N. Y., assignors to Sperry Gyroscope Company, Inc., Brooklyn, N. Y., a corporation of New York Application October 10, 1941, Serial No. 414,422

19 Claims. (Cl. 33—222)

This invention relates broadly to the art of magnetic compasses and, more particularly, to the type of earth's magnetic field indicator in which stationary magnetic cores are subjected to the earth's magnetic field and are also periodically varied in permeability, whereby voltages induced in windings on said cores are used to indicate the direction of the earth's field. Such magnetic devices are termed "flux-valves."

The present invention is an improvement on and may be considered a continuation-in-part of prior application Serial No. 366,370, for Flux-valve magnetic compass, filed November 20, 1940, in the name of O. E. Esval and C. A. Frische, which became Patent No. 2,357,319, issued Sept. 9, 1944.

It is an object of the present invention to provide an improved flux-valve magnetic compass system.

It is another object of the present invention to provide an improved flux-valve system using widely separated pendulous flux valves with combined outputs, whereby errors due to swinging of the flux-valves and to distortion of the magnetic field in the vicinity of the flux-valves are minimized.

It is still another object of the present invention to provide an improved flux-valve magnetic compass system for airplanes or other craft which will minimize errors due to periodic yawing of the craft by the use of widely separated pendulous flux-valves.

It is a further object of the present invention to provide improved forms of flux-valves simple to construct and sensitive in operation for use in magnetic compass systems.

It is still another object of the present invention to provide an improved pendulous mounting for a flux-valve.

It is a further object of the present invention to provide a compass system comprising a pair of earth's field-sensitive means or flux valves and wherein said means or flux valves are separately and independently supported in pendulous fashion and in relatively spaced relation on a craft and on opposite sides of the yaw axis of said craft whereby errors in the output of said sensitive means or flux valves, due to yawing movements of the craft, will be balanced out and will not appear in the indications afforded by the compass system.

It is another object of the present invention to provide improved control amplifiers for controlling a directional gyro from a flux-valve.

Other objects and advantages of this invention will become apparent as the description proceeds.

In the drawings,

Fig. 1 is a schematic representation and wiring diagram of a double flux-valve magnetic compass system.

Fig. 5 is a cross-sectional, elevation view of a modified form of flux valve and pendulum which may be substituted for that of Fig. 2 in the system of Fig. 1, being taken in about the plane 5—5 of Fig. 6.

Fig. 6 is a sectional plan view of the device of Fig. 5, the plane of section being taken below the clamping ring.

Fig. 7 shows a detail cross-section in elevation of the core and energizing coil of the device of Fig. 6, taken in about the plane 7—7 of Fig. 6.

Fig. 11 shows a schematic wiring diagram of one type of control amplifier suitable for use in the system of Fig. 1.

Figs. 12 and 13 show modifications of portions of Fig. 11 specifically that portion to the right of and above line A—A.

Figure 10:
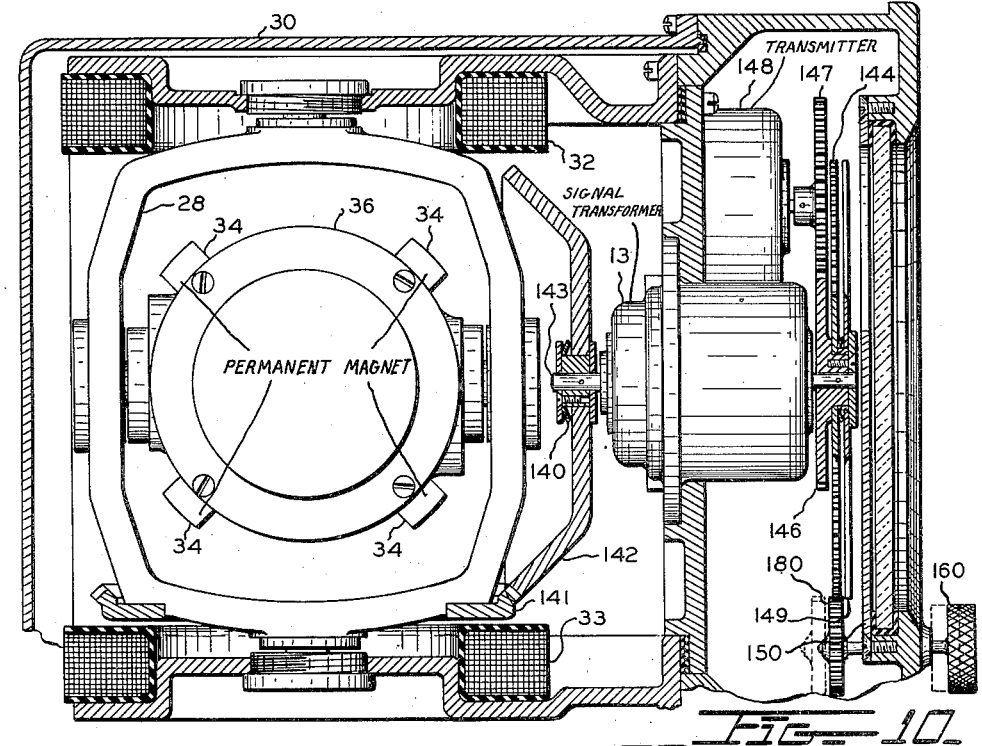
Fig. 10 is a vertical sectional view showing the signal transformer and the directional gyro and its precessing control coils, as in the system of Fig. 1.

The system of Fig. 1, having two flux-valves with combined outputs, is used to reduce errors which otherwise may be present in systems using single pendulously mounted magnetic field responsive devices. As is well known, the flux-valve is an instrument which senses direction of the magnetic flux component within its own plane. In order to indicate magnetic bearings accurately, the plane of the flux-valve must be maintained horizontal, since the vertical component of the earth's field would introduce errors. For this reason, the flux-valve is placed in a pendulous mounting, as shown in above-mentioned application Ser. No. 366,370, and in Figs. 2–9 of the present application, whereby, in the absence of accelerating forces, the plane of the flux-valve is maintained horizontal.

However, if the pendulum is subjected to acceleration or deceleration, the pendulum will oscillate about the true vertical, causing the plane of the flux-valve to oscillate about the horizontal. If these oscillations are symmetrical and of fairly short period, the directional gyro will act as an averaging or integrating device, and its indication will still be accurate.

When used in aircraft, the pendulous flux-valve system is usually mounted remote from the cabin, as in the wing, in order to avoid magnetic interaction with the engine, the many instruments, the controls, and the armor of the airplane, if used. When thus used in an airplane wing, the pendulous system is subjected to varied forms of acceleration. The one most seriously affecting the use of the flux-valve is that experienced while the ship is yawing, since this type of oscillation has a fairly large period and its effect is not averaged out. In yawing, one wing accelerates to a position ahead of the other for one half the cycle, and then decelerates while the other accelerates. By mounting a pendulous flux-valve in the right wing, and one in the left wing, of the craft, both flux-valves will be tilted outward during yaw, resulting, for example, in a forward and left tilt for one while the other has a rearward and right tilt. That is, the angular tilt of each flux-valve pendulum is approximately equal and opposite to that of the other. As a result, for a reasonably small amplitude of oscillation, the change in signal of one flux-valve will be compensated for by that of the other, so that the average instantaneous combined signal of the two flux-valves will give a more accurate indication of the true magnetic bearing.

Another error, which may be at least partially compensated for by the use of two flux valves arranged in the manner described in the foregoing, is that caused by distortion of the earth's magnetic field in the vicinity of the craft due to the large mass of ferrous metals in the engines, armor, and the like, of the craft. The effect which such masses of magnetic material has upon the earth's field produces what may be termed a static deviation error. The error is caused by distortion of the direction of the lines of force of the earth's field in the vicinity of the compass or flux valve. The amount of such distortion will depend, in one sense, upon the disposition of the ferrous materials or magnetic masses and their proximities to the flux valve, and, in another sense, upon the direction and magnitude of any magnetic fields created thereby which affect the earth's field. If one flux valve were to be employed, errors in the output thereof might be present due to this static deviation. However, by arranging two flux valves, one in each wing of the craft, and preferably in the wing-tips, as remote as possible from the fuselage or source of disturbance, the static deviation error present in the combined outputs of both flux valves will not exceed the percentage of error which would otherwise be present if one flux valve were used, and under certain conditions this error may be wholly or at least partially compensated for. For example, for some orientations of the craft in the earth's field, the locally produced distortion of the earth's field may be in opposite senses at the wing-tips of the craft. When this condition exists, and since the flux valves are connected to combine their outputs, the resultant output will represent the average field values existing at both flux valves. Under the assumed conditions that the distortions are in opposite senses, the average of the two errors will be less than either one alone.

Fig. 1 shows a schematic wiring diagram of the entire system. Two flux-valves 1 and 2 are shown as having their primary energizing coils 3, 4 energized in parallel from a suitable source 5 of alternating current. It is to be understood that the coils 3, 4 may be energized in series, or independently, if desired, so long as their energizing currents have the same frequency and proper phase relation. Phase adjusting means may be inserted in the energizing leads of each of coils 3 and 4 if necessary. The output from these flux-valves obtained from triple secondary winding 6, 7, 8 and 9, 10, 11 are connected in three-phase Y or polycircuit fashion, as shown, and thence to a rotary selector switch 12 adapted to transmit the output from either or both flux-valves to a signal transformer 13.

As shown, switch 12 comprises three pairs of fixed contacts 14, 15; 16, 17 and 18, 19. One set 14, 16, 18 is connected to the output of flux-valve 2, the other set 15, 17, 19 being connected to the output of flux-valve 1. Rotor 20 of switch 12 carries three conductive shorting bars 21, 22, 23, each adapted to contact one, the other, both or neither contact of each pair, depending on the position of rotor 20. In this way, the three switch output wires 24, 25, 26, may be selectively connected to flux-valve 1, to flux-valve 2, to both flux-valves or to neither flux-valve, according as switch 20 is set. It is to be noted that the particular switch circuit described is shown for illustrative purposes only, any other switching arrangement accomplishing the same result being within the scope of the present invention. The flux valve outputs need not be parallel-connected, but may be combined in any suitable manner.

If desired, switch 20 could also be adapted to de-energize the primary winding of the flux-valve not in use. In such case, it is desirable to insert a dummy load resistor in order that the load on the source 5 shall remain fairly constant, thus avoiding source voltages fluctuations. Switch 20 could also control the energization of amplifier 31 and gyro 29.

Wires 24, 25, 26 are connected to the polyphase-type stator 35 of signal transformer 13, whose single-phase rotor 27 is carried by the vertical ring 28 of directional gyro 29. The output of rotor 27 is fed to control amplifier 31, shown more particularly in Figs. 11-13. Amplifier 31 is energized from the same source 5 as are the primary energizing windings of the flux-valves 1 and 2.

The output of amplifier 31 controls the precessing coils 32, 33, which cooperate with permanent magnets 34 fixed to the rotor bearing housing or case 36 pivoted in vertical ring 28 about horizontal pivots 37, to precess gyro 29 about its azimuth axis until the gyro spin axis corresponds to the direction of the earth's field, as will be explained more in detail with respect to Figs. 10-13. In this way, as has been explained in the above-mentioned prior application Ser. No. 366,370, the gyro 29 is enslaved by the flux-valve to indicate magnetic bearings by means of a suitable dial 38 mounted on vertical ring 28.

The flux valves are mounted on and adapted to turn in azimuth with a dirigible craft. The directional gyro 29, however, may rotate about its vertical or azimuth axis relative to the craft as the craft turns in azimuth and also relative to both flux valves. Assuming that the gyro has maintained a predetermined azimuthal orientation, it should be free from any processing torque. However, unless some compensating means are provided, such as the signal transformer 13, the turning of the craft and the flux valves therewith in azimuth would provide an application of a precessing torque to the gyro. However, by relatively rotating the windings of the signal transformer 13 in accordance with turning of the craft and the flux valves in azimuth, the electrical relationship thereof will be preserved when azimuthal rotation of the flux valve only and not of the gyro spin axis occurs, and hence compensation for azimuthal rotation of the flux valves without azimuthal rotation of the gyro vertical ring is accomplished. In the somewhat schematic showing of our system disclosed in Fig. 1, the polyphase windings 35 of the signal transformer are arranged to rotate in azimuth with the flux valves, while the single-phase winding 27 thereof rotates with azimuthal rotation of the vertical ring of the gyro and relative to the polyphase windings. Therefore, for all movements of the flux valves in azimuth, the gyro precessing motor will exert no torque unless the gyro wanders or deviates from its predetermined position of orientation in azimuth. If deviation or wandering of the gyro should occur, the electrical relationship of windings 27 and 35 of the signal transformer will vary, thereby producing a voltage which will cause the gyro to precess in a deviation-correcting direction.

Figure 2:
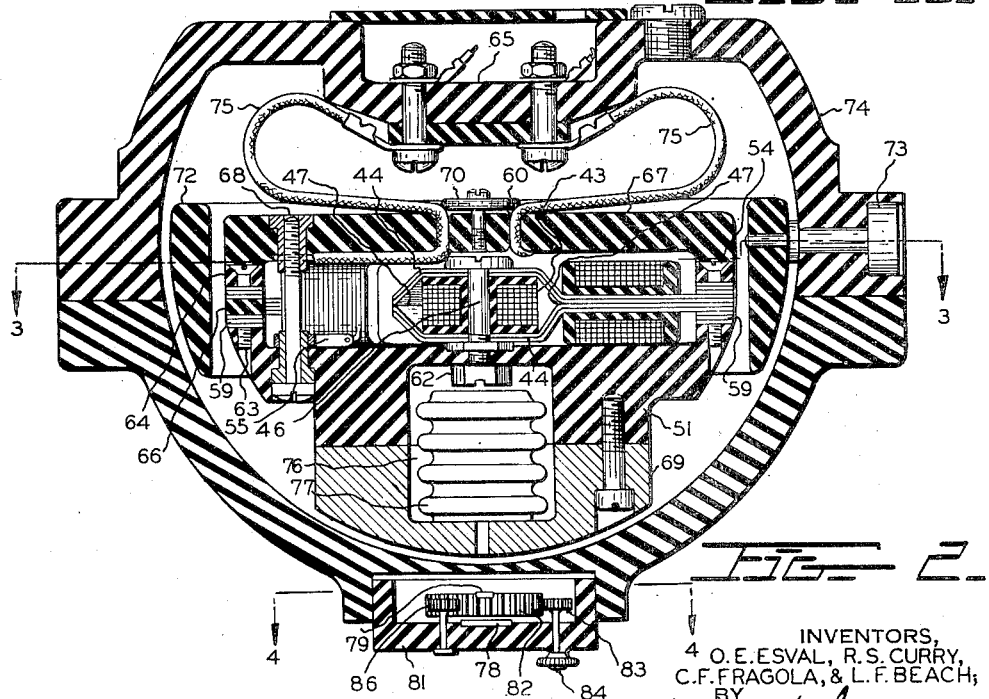
Fig. 2 is a cross-sectional, elevation view of one form of flux-valve and its pendulous mounting, taken in about the plane 2—2 of Fig. 3.
Figure 3:
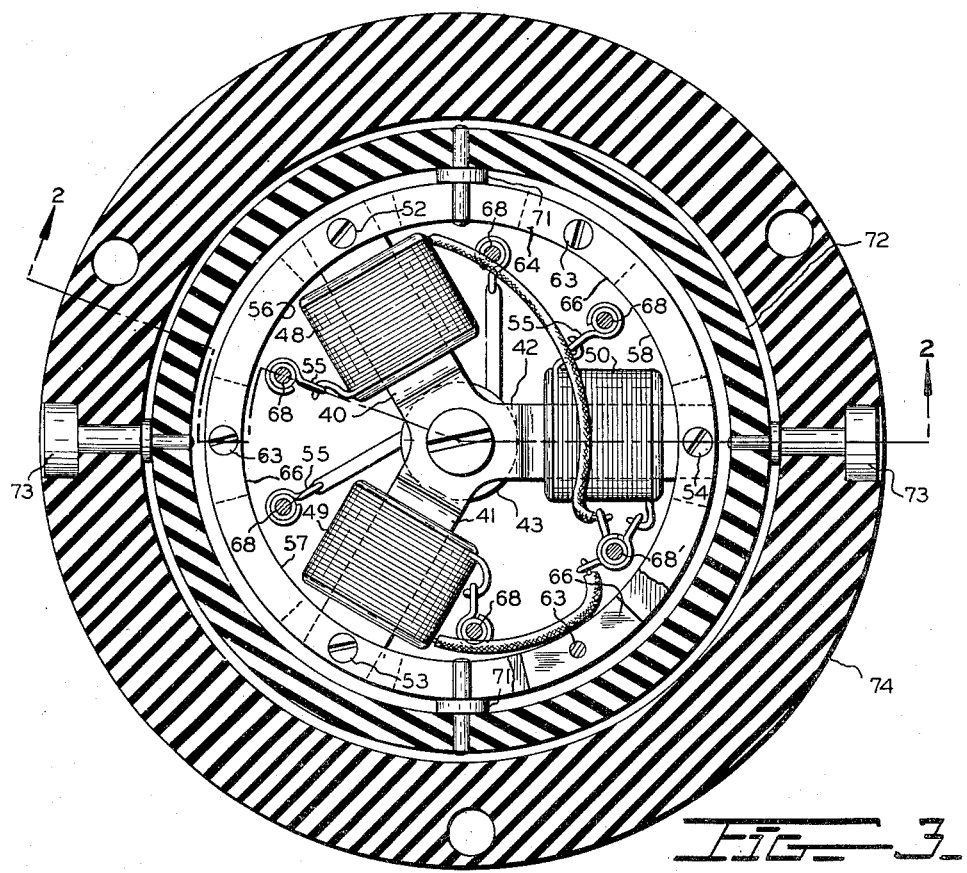
Fig. 3 is a cross-sectional view of the device of Fig. 2, taken in about the plane 3—3 thereof.
Figure 4:
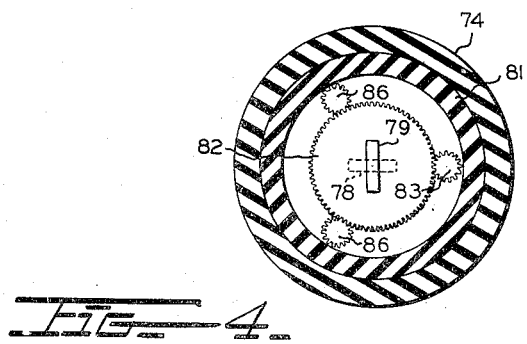
Fig. 4 shows a cross-section in plan of the magnetic field compensating device, being taken in about the plane 4—4 of Fig. 2.

Figs. 2–4 show one form of pendulous flux valve suitable for use in the system of Fig. 1. In this form, the magnetically permeable core is of multipolar form, having multiple arms 40, 41, 42, in this case shown as three in number, equi-angularly spaced. This core member is formed of laminated sheets, preferably integrally stamped.

The exciting coil 43 is positioned with its axis perpendicular to the core member. Laminations 44 of the core member are placed either side of the coil 43 and are held fixed thereto by a screw 46 passing through coil 43 and laminations 44. Screw 46 is of magnetic material and forms part of the core structure for the exciting coil 43.

The laminations 44 on each end of coil 43 are bent together and joined, as at 47, to form the three single core arms 40, 41, 42 symmetrically positioned with respect to coil 43. Around these arms 40, 41, 42 are placed the pick-up coils 48, 49, 50. The laminations 44 are held together at the ends of the core arms 40, 41, 42 by bolts 52, 53, 54, which also hold the flux collecting arms 56, 57, 58, shown as formed of arcuate laminations 59 placed concentric with coil 43 and above and below the core arms 40, 41, 42 at their ends.

The entire assembly thus far described is fastened to a non-magnetic supporting member 51 by means of central screw 46, cooperating with nut 62, by screws 52, 53 and 54, and by further screws 63. Supporting member 51 may be metallic or non-metallic, as desired, but is preferably non-metallic. A clamping ring 64 also of non-magnetic material is placed over laminations 59 and serves to hold them down. Spacers 66 serve to keep the two laminated portions of flux collector arms 56, 57, 58 separated.

Supporting member 51 is provided with a cover 67 fastened thereto as by bolts 68. Bolts 68 may also serve as lead-ins to the coils of the unit. Thus, lugs 55 serve to connect the primary and secondary windings to bushings surrounding bolts 68. As shown more clearly in Fig. 3, one terminal of each secondary coil is thus connected to a common bolt 68′, the primary winding terminals and the other terminals of the secondary windings being connected to individual bolts 68. A circular arrangement of openings 60 is provided in the cover 67, and wires 75 lead from bushings threadedly engaged by the upper ends of bolts 68 through openings 60 to a terminal board 65 provided at the top of the instrument. A clamping member 70 is screwed into cover 67 to hold the lead-in wires 75 in place.

This arrangement provides an easy arrangement for assembly or dis-assembly, and furthermore causes little interference between the lead-in wires 75 and the pendulous mounting of the flux valve during oscillation of the pendulum. If desired, wires 75 may be replaced by conductive resilient members, which further serve to center the pendulum.

It is essential that the magnetic circuit of each of the pick-up coils 48, 49, 50 be exactly similar, to avoid direct inductive pick-up from exciting coil 43. Hence, coil 43 should be positioned exactly symmetrically with respect to core arms 40, 41, 42, and coils 48, 49, 50 should be identical in construction and similarly positioned on the core arms.

Supporting member 51 is used as the pendulous portion of the pendulous flux valve mount. For this purpose, a large non-magnetic mass 69 is fastened to the bottom of support 51, and this assembly is then pivoted, as by pivots 71, in a gimbal ring 72 also of non-magnetic material. Ring 72 in turn is pivoted about a second axis perpendicular to the first pivot axis, as by pivots 73, in housing 74, shown as formed of two suitably fastened sections. Housing 74 carries the terminal board 65 at its top, thus permitting external connections. The entire housing 74 may be filled with fluid, such as oil, to provide damping for the pendulous motion of supporting member 51, and also to prevent weather and ageing effects on the flux valve coils and wires.

In order to allow for temperature effects, which tend to change the volume and pressure of the fluid and might damage the housing 74, a hollow bore 76 is provided within support 51 and pendulous mass 69. This bore contains a sealed Sylphon bellows 77. Accordingly, as the fluid pressure and/or volume changes, the bellows 77 changes its volume to compensate therefor, and the housing 74 remains sealed at all times.

Housing 74 is adapted to be mounted at remote portions of a ship or aircraft, to be isolated as much as possible from stray magnetic fields. However, it is not possible to fully isolate the flux valve from such stray fields, so that it may be necessary to compensate for these fields. A suitable compensating means is shown in Figs. 2 and 4.

This compensating means comprises two small permanent bar magnets 78, 79 mounted to be relatively rotatable. Thus, magnet 78 is fixed in non-magnetic member 81, which is rotatably supported in casing 74, while magnet 79 is mounted in a non-magnetic member 82 formed as a gear. Gear 82 is rotated by pinion 83 controlled from a knob 84. Pinions 86 are idlers acting to center gear 82. It will be clear that in this way the resultant field of magnets 78, 79 may be smoothly varied from zero (when the two magnets are aligned oppositely) to double the strength of either magnet (when the two magnets are aligned in aiding relation). Thus the amount of compensating field may be adjusted.

To adjust the orientation of the compensating field, magnet supporting member 81 is made rotatable within housing 74 and may be adjusted to any desired orientation. In this way the compensating field may be adjusted both in magnitude and orientation.

It is believed that one limitation on extreme accuracy and fineness of balance in the device of Figs. 2-4 resides in the grain structure of the laminated material from which core members 40, 41, 42 are formed. Due to the rolling operations to which the sheet metal has been subjected, a definite grain direction is developed, which has different directions with respect to the core arm orientation when all arms are integrally stamped from one sheet.

Figs. 5-7 show a further modification of the flux-valve designed to overcome the above apparent difficulty. This form is adapted for use with the same pendulous mounting shown in Figs. 2-4. Here the exciting coil 91 is placed about a tapped central core member 92. Laminated core end pieces 93, 94 are fastened to central member 92, as by screws 96. The magnetic circuit of the exciting coil 91 is completed by bolts 97 and magnetic spacers 98 which serve to fasten the laminated core arms of magnetic material 99, 100, 101 centrally and symmetrically with respect to exciting coil 91. Since core arms 99, 100, 101 are now formed as simple laminated strips, their grain structure may be selected similarly in all pieces, thereby improving the magnetic balance.

Pick-up coils 102, 103, 104 are placed about core arms 99, 100, 101. These coils are made elongated and enclose a substantial portion of the core arms, so that slight misplacements will not materially affect the magnetic balance.

Figure 9:
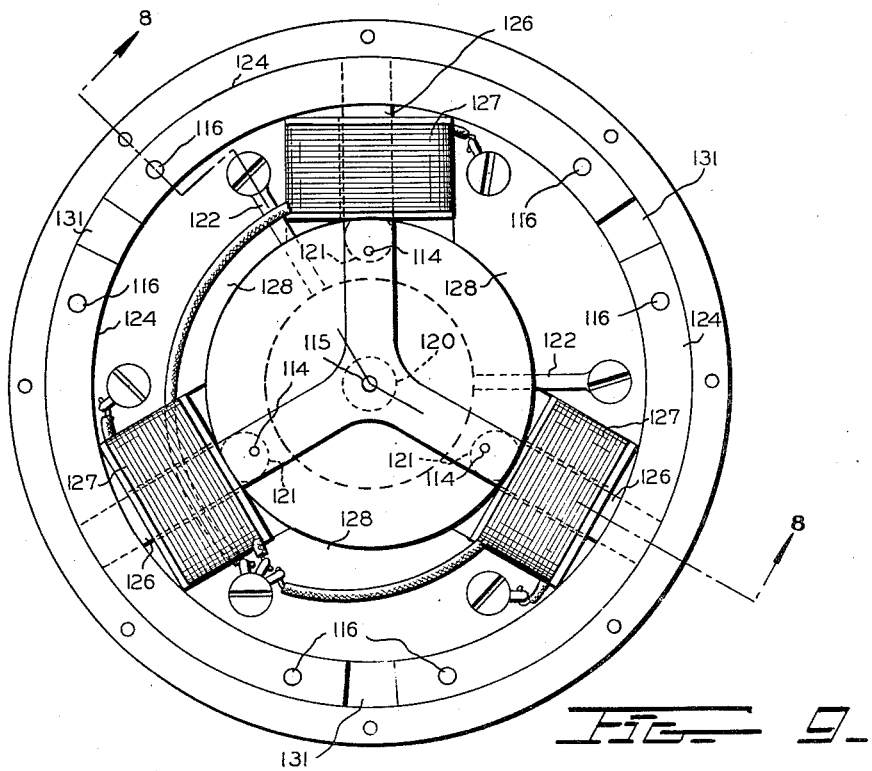
Fig. 9 shows a plan view of the device of Fig. 8, with cover and other parts removed.

As a further modification, pick-up coils 102, 103, 104 may, like those shown in Fig. 9, be made relatively short in an axial direction, and placed at the extreme ends of the core arms whereby the direct inductive pick-up from primary coil 91 is minimized as well as balanced out.

Flux collector arms 106, 107, 108 are provided as in Figs. 2-4, and a similar housing may be used.

Figs. 5 and 6 show this modified form of flux valve mounted in a pendulum element similar to that of Fig. 2, Fig. 6 having cover 67 removed. Similar elements are given the same reference character, and the description above applies here also.

Figure 8:
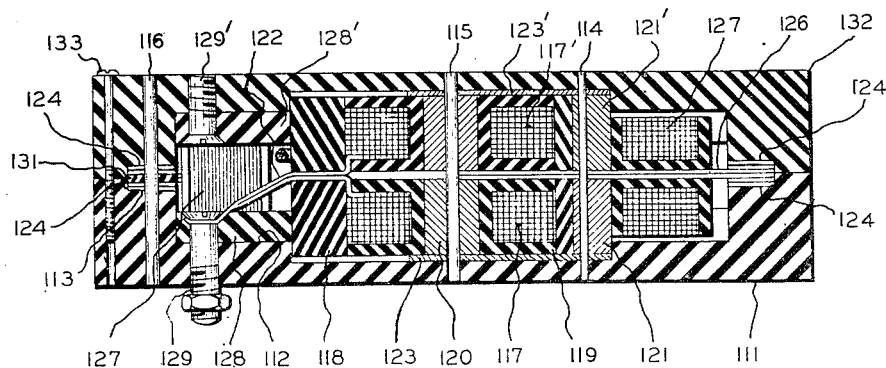
Fig. 8 shows a cross-section in elevation of a further modified form of flux valve, being taken in about the plane 8—8 of Fig. 9.

Figs. 8 and 9 show a further modified form of flux valve especially adapted for convenient assembly. A base 111 of non-magnetic material is formed with a plurality of concentric ledges 112, 113. A center pin 115 is fastened centrally of base 111, as by forced fit or by being permanently inserted during the molding or casting process by which base 111 is formed. Circular arrangements of locating pins 114 and 116 are similarly fastened to base 111.

Two identical energizing coil sub-assemblies are formed by pressing coil 117, wound on a non-magnetic bobbin 119, into a non-magnetic ring 118. Ring 118 is drilled to receive three equally spaced magnetic pins 121 placed as near the periphery of ring 118 as possible and one similar pin 120 placed at the center. These pins may be secured in ring 118 by means of a pressed or driving fit. Pins 121 may project slightly from ring 118, in which case they are ground down to conform to the cylindrical surface of ring 118. Magnetic pins 121 and 120 are then drilled to receive locating pins 114 and 115. The terminals of coil 117 are led out by flat terminal strips 122.

In assembly, a three-armed spider core 123 drilled to receive pins 114 and 115, is placed over these pins and thereby located in the base 111. Then one energizing coil assembly just described is placed over spider 123, being also located by pins 114 and 115.

Arcuate magnetic flux collector arms 124, drilled to receive pins 116, are placed over these pins and are thereby located on ledge 113 concentrically of the device. A magnetic three-legged core 126, also drilled to receive pins 114, has three pick-up coils 127 placed on its legs, and is then placed over coil 117, thereby completing the magnetic circuit of this coil through pins 121, spider 123 and pin 120. The arms of core 126 are in magnetic contact with flux collector arms 124. Non-magnetic spacers 128 are fastened to base 111 on ledge 112 as by screws 129, and serve to properly locate coils 127 so that no stress is placed on the legs of core 126 to disturb or distort its magnetic properties. Further non-magnetic spacers 131 are positioned over flux collector arms 124, being also located by pins 116. A second set of flux collector arms 124 is then placed over spacers 131. A second identical energizing coil assembly 117' is placed on top of core 126, and a second spider core 123' is placed thereon, both being located by pins 114. A cover 132, identical in shape with base 111 and drilled to receive pins 114, 115, 116, also carries spacers 128'. Cover 132 is placed over the device thus far assembled and fastened to base 111 by screws 133. Terminals and the energizing and pick-off coils are connected to screws 129 and are led thereby to the outside of the device.

There is thus provided a flux valve absolutely symmetrical in construction and extremely simple to fabricate and assemble. It is generally similar to that of Fig. 7, except that the energizing coil is split into two portions and the core arms extend between the coil sections.

This flux valve is also adapted to be placed in a pendulous mount as in Fig. 2 or 5. Thus, a pendulous mass may be fastened to the bottom of the flux-valve (shown uppermost in Fig. 8) and pivots may be provided to pivotally mount this pendulous device in a gimbal ring, as in Fig. 2.

Fig. 10 shows a structural embodiment of directional gyro and signal transformer for use in the system of Fig. 1. The directional gyro rotor is mounted in a gyro rotor housing or case 36 for spinning about a horizontal axis. Rotor case 36 is pivoted in vertical gimbal ring 28 about a second horizontal axis, and ring 28 is in turn pivoted in gyro casing 30 to pivot about a vertical or azimuthal axis. Attached to vertical ring 28 is a horizontal ring gear 141 wich meshes with a vertical gear 142 and thereby actuates shaft 143 through a friction clutch arrangement 140.

Mounted on shaft 143 is the rotor of signal transformer 13, whose casing is fastened to a wall of gyro casing 30. Shaft 143 extends through signal transformer 13 and carries a dial 144 and a gear 146 which engages a gear 147 and thereby rotates the rotor of a remote position transmitter 148 which may actuate a remote repeater compass.

Associated with dial 144 is a course indicator 149 and a masking shield 150. This dial arrangement may be similar to that shown in prior application Serial No. 391,060, for Directional gyros, filed April 30, 1941, in the name of L. F. Carter and F. D. Braddon. In this way a very compact and structurally simple arrangement of directional gyro, signal transformer and indicator is provided.

Fastened to housing 30 symmetrically with respect to rotor housing 36 are precessing coils 32, 33 having vertical axes. Rotor housing 36 carries four parallel permanent magnets 34, similarly disposed with corresponding poles at the same end. The magnets 34 are placed parallel to the spin axis of the gyro rotor.

Coils 32, 33 are center-tapped and are parallel connected as shown in Figs. 1 and 11-13 so that each will produce a magnetic field of one or the other polarity, depending on which half of the centertapped coil carries more current, which, in turn, depends on the sense of relative displacement between the flux-valve magnetic axis and the gyro axis. These magnetic fields will create magnetic forces on permanent magnets 34, acting about the horizontal pivot axis of rotor housing 36 in vertical ring 28, and resulting in precession of the gyro rotor about a vertical axis. Hence the gyro is controlled in azimuth from the flux-valve, and may be used to give an integrated or average indication of the direction of the external magnetic field acting on the flux-valve.

Instead of using two coils 32, 33 and four magnets 34, it is possible to dispense entirely with one coil and its corresponding pair of magnets, if desired. Also, instead of using a center-tapped coil, it is possible to use one single coil at the top and one at the bottom, each cooperating with two magnets and energized oppositely. Then the differential change in current in these coils produced by the flux-valve and control circuit would unbalance the magnetic forces acting on the rotor housing, and cause precession of the gyro until balance is again restored.

Slip clutch 140 between gyro vertical ring 28 and signal transformer 13 provides a means for relatively adjusting these two elements. Thus, upon first starting the gyro, its orientation is purely arbitrary, depending only on its position when shut down. Hence, in general, it will not be in correspondence with the signals transmitted from the flux valve, as evidenced by the indicators described with respect to Figs. 12 and 13. Previously it was necessary to reset the gyro into substantial correspondence before starting it spinning. However, in the present invention, the gyro may be started at once, and the resetting done by rotating signal transformer 13, by means of card 144, pinion 189 and setting knob 160.

Fig. 11 shows a suitable type of phase-sensitive control amplifier for use in the system of Fig. 1. The input to the amplifier, derived from the output of signal transformer 13, is of twice the frequency of source 5. This input is fed to a two-stage amplifier comprising amplifier tubes 151, 152 coupled by a combined coupling transformer and band pass filter 153 tuned to pass twice the frequency of source 5. Tubes 151, 152 are shown as energized from a conventional voltage doubler 165 although any suitable D.-C. supply could be used. The output of tube 152 is coupled by way of tuned coupling transformer 154 to a phase-sensitive rectifier comprising two push-pull connected tubes 156, 157. Tubes 156, 157 are anti-phasally energized or energized in out-of-phase relation from the output of tube 152, and co-phasally energized or energized in out-of-phase relation from source 5 by way of a frequency doubler comprising rectifier bridge 158 and transformer 159. High resistor 170 acts to limit the direct current output of bridge rectifier 158, while condenser 175 serves to pass the double frequency component to transformer 159, by means of which this double frequency voltage is applied co-phasally to the plate circuits of tubes 156, 157. Adjustable resistor 155 connected in the common cathode leg of tubes 156, 157 serves as a source of bias voltage for the grids of tubes 156 and 157. The load circuits of tubes 156, 157 contain coils 161, 162 of a double-throw balanced relay. These coils are energized by the direct current components of the outputs of tubes 156, 157, the alternating current components being by-passed by condensers 163, 164.

With zero signal input, relay armature 166 remains centrally positioned, being equally attracted by both coils 161, 162. Upon presence of a signal, the armature will move one way or the other, toward the more strongly energized coil 161 or 162, which depends upon the phase of the input signal relative to the voltage of transformer 159.

Relay armature 166 when actuated, therefore, connects one side of battery 179 to either wire 167 or 169. In this way the direction of current in coils 32, 33 (see Figs. 1 and 10) is controlled according to the relative deviation between signal transformer 13 (or directional gyro 29) and flux valve 1 and/or 2. These coils then set up a magnetic field which interacts with permanent magnets 34 fastened to gyro rotor housing 36 to produce precessing torques which act to turn the gyro into correspondence with the flux valve indication, and thereby maintain the gyro orientation with respect to the direction of the earth's magnetic field.

Fig. 12 shows a modification of Fig. 11, replacing that portion of Fig. 11 to the right of line A—A. Here the output of tubes 156, 157 is amplified in a direct-current energized direct current amplifier 171 comprising push-pull connected tubes 172, 173. The center-tapped precessing coils 32 and 33 are shown as forming the load impedances of this amplifier. Respective part windings of coils 32 and 33 are connected in parallel, the center taps thereof being connected together as shown. Placed across the sections of coil 32 are neon indicators 174. These indicators may be adjusted to glow when the current in their respective sections of coil 32 exceeds normal current by a predetermined amount, such as that corresponding to 3 degrees deviation between flux valve axis and gyro (or signal transformer) orientation. These indicators are especially useful when first starting the gyro, as at that time its orientation is arbitrary, and the precessing rate is too low to cause the gyro to orient itself in a reasonable time. These indicators will then show that resetting of the gyro or signal transformer is necessary, which may be performed manually to within 3 degrees. Indicators 174 may be adjusted to glow at the proper deviation by adjusting the amplification of tubes 172, 173, or by inserting series resistors of the proper value.

Fig. 13 shows a further modification, in which tubes 172, 173 are replaced by thyratrons 176, 177 energized from source 5 through transformer 178. These give sharper control of precessing coil 32 and yield full precessing action almost instantaneously.

While tubes 151, 152, 156, 157, 172, 173 have been illustrated as being triodes, it is clear that any suitable type of amplifier tube may be used in place of these tubes. Especially, pentodes may be used in place of triodes 172, 173 if more gradual control action is desired.

Although the above description has been concerned only with controlling a directional gyro from a flux valve, it is clear that the output of amplifier 31 could equally well control any other type of controllable indicator, or even serve to control navigation of a craft.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent:

1. A magnetic compass for aircraft comprising a pair of pendulously mounted flux valves positioned one in each wing of said craft, means for combining the outputs of said flux valves, and indicator means responsibe to the resultant combination for indicating magnetic bearings, whereby errors due to yawing of said craft are reduced.

2. A magnetic field responsive device comprising a magnetic core having a plurality of spaced radial arms disposed substantially in one plane, energizing coil means positioned centrally of said core with its magnetic axis perpendicular to said plane and being symmetrically disposed with respect to said plane, and pick-up coil means positioned on each of said arms.

3. A magnetic field responsive device comprising a magnetic core having a plurality of radial equi-angularly spaced arms disposed substantially in one plane, energizing coil means positioned centrally of said core with its magnetic axis perpendicular to said plane and symmetrically disposed with respect to said plane, and pick-up coil means symmetrically positioned on each of said arms.

4. A magnetic field responsive device as in claim 2, in which said core comprises a pair of magnetic spiders fastened respectively at each end of said energizing coil means, said spiders having similar radially extending arms, and means for clamping corresponding ones of said arms together to form core arms disposed at the longitudinally median plane of said energizing coil means.

5. A magnetic field responsive device as in claim 2, in which said core comprises a pair of magnetic spiders fastened respectively at each end of said energizing coil means, said spiders having similar radially extending arms, means for clamping corresponding ones of said arms together to form core arms disposed at the longitudinally median plane of said energizing coil means, and circumferentially extending magnetic flux collector arms fastened at the ends of said radial core arms.

6. A magnetic field responsive device as in claim 2, in which said core comprises a pair of magnetic end plate members, means for fastening said members at respective ends of said energizing coil means, a plurality of magnetic core members, and means clamping said core arm members between said end plate members in radial positions in a plane longitudinally median of said coil energizing means.

7. A magnetic field responsive device as in claim 2, in which said core comprises a pair of magnetic end plate members, means for fastening said members at respective ends of said energizing coil means, a plurality of elongated magnetic core arm members having similar grain directions, and means clamping said core arm members between said end plate members in radial positions in a plane longitudinally median of said coil energizing means.

8. A magnetic field responsive device as in claim 2, in which said energizing coil means comprises two similar axially-aligned coils, and in which said core comprises a magnetic spider having radial arms and positioned between said coils, two magnetic spider core pieces positioned respectively at the outer ends of said coils, and magnetic members magnetically joining each of said spider core pieces to said centrally positioned spider.

9. A compass system for dirigible craft comprising a pair of means sensitive to an external magnetic field and adapted to provide signal voltage outputs varying with azimuthal positions thereof, means for pendulously supporting said pair of means for independent and pendulous movement and said pair of means being supported to move in azimuth with said craft and in appreciably spaced relation on, respectively, opposite sides of the yaw axis of said craft, azimuth indicator, means for combining the signal outputs from said field-sensitive means, and means controlled by the resultant signal combination for controlling said indicator.

10. A compass system for dirigible craft comprising a pair of flux valves each adapted to provide a signal voltage output varying with azimuthal positions thereof in the earth's magnetic field, means for pendulously supporting said flux valves for independent and pendulous movement, said flux valves being supported to move in azimuth with said craft and in appreciably spaced relative relationship, respectively, on opposite sides of the yaw axis of said craft, an indicator, means for combining the signal outputs from said valves, and means controlled by the resultant signal combination for positioning said indicator.

11. A gyro magnetic compass system for dirigible craft comprising a pair of flux valves each adapted to provide a signal voltage output varying with azimuthal positions thereof in the earth's magnetic field, means for supporting said flux valves for independent and pendulous movements, said flux valves being supported to move in azimuth with said craft and in appreciably spaced relative relationship, respectively, on opposite sides of the yaw axis of said craft, a directional gyro, means for precessing said gyro about its azimuth axis, means for combining the signal outputs from said valves, and means controlled by the resultant signal combination for controlling said precessing means.

12. A gyro magnetic compass system for dirigible craft comprising a pair of flux valves each adapted to provide a signal voltage output varying with azimuthal positions thereof in the earth's magnetic field, means for supporting said flux valves on said craft and to move in azimuth with said craft and for independent and pendulous movements in appreciably spaced relative relationship, respectively, on opposite sides of the yaw axis of said craft, a directional gyro, means for precessing said gyro about its azimuth axis, electrical means controlled by said flux valves for controlling said precessing means and including a pair of electrically cooperable, relatively movable elements, one thereof being fixed to said craft to move in azimuth with said flux valves, and one thereof being responsive to the signal outputs of both flux valves and the other being affected by a change in electrical relationship of said elements to effect an operation of said gyro-precessing means, and means controlled by said gyro for effecting relative movement of said elements when azimuthal rotation of said flux valves and one of said elements occurs whereby to preserve an electrical relationship of said elements while a departure of said gyro from a predetermined azimuthal position will cause a precession thereof.

13. A gyro magnetic compass system for dirigible craft comprising a pair of flux valves each adapted to provide a signal voltage output varying with azimuthal positions thereof in the earth's magnetic field, means for supporting said flux valves to move in azimuth with said craft and for independent and pendulous movements in appreciably spaced relative relationship, respectively, on opposite sides of the yaw axis of said craft, a directional gyro movable in azimuth relative to said valves, means for precessing said gyro about its azimuth axis, a receiver for combining the signal outputs of both valves, and means including means electrically responsive to said receiver for controlling said precessing means, said receiver and said means electrically responsive thereto being relatively movable and one thereof being movable in azimuth with said flux valves and the other being operatively connected with said gyro for orientation thereby.

14. A gyro magnetic compass system for a craft comprising a pair of flux valves each adapted to provide signal voltage outputs varying with azimuthal positions thereof in the earth's magnetic field, means for supporting said flux valves for independent pendulous movements in widely spaced positions, respectively, on the opposite sides of the yaw axis of said craft and to move in azimuth with said craft, a directional gyro movable in azimuth relative to said flux valves and craft, means for precessing said gyro about its azimuth axis, and control means for said precessing means, said control means including a signal transformer having two relatively movable windings, a first thereof being connected to receive and combine the outputs from said flux valves and one being fixed against azimuthal rotation relative to said valves and the other winding being movable relative thereto with azimuthal rotation of said gyro whereby a precession-effecting control signal is produced in the second of said windings when a departure of said gyro from a predetermined azimuthal position occurs.

15. A gyro magnetic compass system for a craft comprising a pair of means sensitive to the earth's field and adapted to provide signal voltage outputs varying with azimuthal positions thereof in the earth's magnetic field, means for supporting said field-sensitive means for independent pendulous movements in widely spaced positions, respectively, on opposite sides of the yaw axis of said craft and to move in azimuth with said craft, a directional gyro movable in azimuth relative to said field-sensitive means and craft, means for precessing said gyro about its azimuth axis, and control means for said precessing means, said control means including a signal transformer having relatively movable, polyphase and single-phase windings, the polyphase winding being connected to receive and combine the outputs from said field-sensitive means, one winding being fixed to rotate in azimuth with said craft and the other being movable in azimuth with said gyro whereby a control signal is produced in said single-phase winding when a departure of said gyro from a predetermined azimuthal position occurs.

16. A gyro magnetic compass system for dirigible craft, comprising a pair of means sensitive to the earth's magnetic field and adapted to provide signal voltage outputs varying with azimuthal positions thereof in said field, and means for supporting said means to move in azimuth with said craft and for independent and pendulous movements, said pair of means being supported in widely spaced relative relationship, respectively, on opposite sides of the yaw axis of said craft, a directional gyro, means for precessing said gyro about its azimuth axis, means for combining the signal outputs from said pair of means, and means controlled by the resultant signal combination for controlling said precessing means.

17. A compass system for aircraft comprising a pair of means sensitive to the earth's magnetic field and adapted to provide signal voltage outputs varying with azimuthal positions thereof in said field, means for pendulously supporting said pair of means for independent and pendulous movement, said pair of means being mounted one in each wing of said craft, means for combining the outputs of said pair of means, and azimuth-indicating means responsive to the resultant signal combination for indicating magnetic bearings.

18. A compass system for dirigible craft comprising a pair of means sensitive to the earth's magnetic field and adapted to provide signal voltage outputs varying with azimuthal positions thereof, means for pendulously supporting said pair of means for independent and pendulous movement, said pair of means being positioned one in each wing of said craft, a directional gyro, means for precessing said gyro about its azimuth axis, means for combining the signal outputs from said pair of means, and means controlled by the resultant signal combination for controlling said precessing means.

19. A magnetic compass system for aircraft comprising a pair of gimbal-mounted flux valves positioned one in each wing of the craft, means for combining the outputs of said flux valves, an azimuth indicator, and means controlled by the resultant signal combination for controlling said azimuth indicator.

ORLAND E. ESVAL.
ROBERT S. CURRY.
CAESAR F. FRAGOLA.
LENNOX F. BEACH.

CERTIFICATE OF CORRECTION.

Patent No. 2,383,461. August 28, 1945.

ORLAND E. ESVAL, ET AL.

It is hereby certified that error appears in the printed specification of the above numbered patent requiring correction as follows: Page 2, second column, line 15, for the word "output" read --outputs--; line 46, for "voltages" read --voltage--; page 4, second column, line 58, for "wich" read --which--; page 5, first column, line 52, for "pinion 189" read --pinion 180--; line 72, for "out-of-phase" read --in-phase--; and that the said Letters Patent should be read with this correction therein that the same may conform to the record of the case in the Patent Office.

Signed and sealed this 18th day of December, A. D. 1945.

Leslie Frazer (Seal)                  First Assistant Commissioner of Patents.